United States Patent
Krijn et al.

(10) Patent No.: US 7,876,397 B2
(45) Date of Patent: Jan. 25, 2011

(54) BACKLIGHT FOR 3D DISPLAY

(75) Inventors: Marcellinus P. C. M. Krijn, Eindhoven (NL); Willem L. Ijzerman, Eindhoven (NL); Siebe T. De Zwart, Valkenswaard (NL); Hugo J. Cornelissen, Waalre (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 491 days.

(21) Appl. No.: 10/573,084

(22) PCT Filed: Sep. 23, 2004

(86) PCT No.: PCT/IB2004/051839
§ 371 (c)(1), (2), (4) Date: Mar. 23, 2006

(87) PCT Pub. No.: WO2005/031412
PCT Pub. Date: Apr. 7, 2005

(65) Prior Publication Data
US 2007/0109811 A1    May 17, 2007

(30) Foreign Application Priority Data
Sep. 27, 2003  (GB) ................................. 0322682.6

(51) Int. Cl.
G02F 1/1335  (2006.01)
(52) U.S. Cl. .............................. 349/65; 349/15; 349/61; 349/62; 349/63; 349/66; 349/95; 349/96; 349/116
(58) Field of Classification Search .................. 349/15, 349/95–96, 116, 61–63, 65–66
See application file for complete search history.

(56) References Cited

U.S. PATENT DOCUMENTS

| 5,546,492 | A | * | 8/1996 | Ansley et al. ................ 385/116 |
| 5,600,462 | A | * | 2/1997 | Suzuki et al. ................ 349/112 |
| 5,729,311 | A | * | 3/1998 | Broer et al. .................... 349/65 |
| 5,747,796 | A | * | 5/1998 | Heard et al. ........... 250/227.26 |
| 5,831,765 | A | * | 11/1998 | Nakayama et al. .......... 359/464 |
| 5,887,964 | A | * | 3/1999 | Higuchi et al. .............. 362/620 |
| 5,897,184 | A | * | 4/1999 | Eichenlaub et al. ........... 349/64 |
| 5,966,192 | A | * | 10/1999 | Higuchi et al. ................ 349/61 |
| 6,020,944 | A | * | 2/2000 | Hoshi .......................... 349/62 |
| 6,049,649 | A | * | 4/2000 | Arai ........................... 385/133 |
| 6,104,446 | A | * | 8/2000 | Blankenbecler et al. ......... 349/5 |
| 6,154,262 | A | * | 11/2000 | Ogura ......................... 349/61 |
| 6,191,833 | B1 | * | 2/2001 | Hirakata ...................... 349/61 |
| 6,379,017 | B2 | * | 4/2002 | Nakabayashi et al. ....... 362/619 |
| 6,474,827 | B2 | * | 11/2002 | Shinohara et al. ........... 362/607 |

(Continued)

FOREIGN PATENT DOCUMENTS

EP  0879991 A2  11/1998

(Continued)

*Primary Examiner*—Brian M. Healy
*Assistant Examiner*—Guy G Anderson

(57) ABSTRACT

A backlight (5) for a 3D display device, the backlight (5) comprising a planar light guide (7) through which light is guided transversely by internal reflection. The light guide (7) is provided with a plurality of grooves (8), which are configured to direct light propagating within the light guide (7), out of a face (7*f*) of the light guide (7) so as to form a plurality of line light sources.

21 Claims, 4 Drawing Sheets

U.S. PATENT DOCUMENTS

| | | | |
|---|---|---|---|
| 6,545,811 B1 * | 4/2003 | Fujimoto | 359/619 |
| 6,633,351 B2 * | 10/2003 | Hira et al. | 349/95 |
| 6,996,296 B2 * | 2/2006 | Bastiaansen et al. | 385/11 |
| 7,128,459 B2 * | 10/2006 | Igarashi et al. | 362/621 |
| 7,220,038 B2 * | 5/2007 | Yamashita et al. | 362/606 |
| 7,265,800 B2 * | 9/2007 | Jagt et al. | 349/61 |
| 2002/0089620 A1 * | 7/2002 | Yamamoto et al. | 349/96 |
| 2005/0162586 A1 * | 7/2005 | Bae | 349/95 |

FOREIGN PATENT DOCUMENTS

| | | |
|---|---|---|
| EP | 1154306 A1 | 11/2001 |
| JP | 08221198 A | 8/1996 |
| JP | 10268805 A | 10/1998 |
| JP | 2000171798 A * | 6/2000 |
| JP | 2000222923 A | 8/2000 |
| WO | 0188430 A1 | 11/2001 |
| WO | 2005031412 A2 | 4/2005 |

* cited by examiner

BACKLIGHT FOR 3D DISPLAY

The present invention relates to a backlight for a 3D display device, the backlight comprising a planar light guide through which light is guided transversely by internal reflection.

Recently, rapid progress has been made in the research and development of three-dimensional (3D) image displays. Of the different concepts proposed, many rely on the user wearing special glasses in order to see a 3D image. However, glasses are not convenient for a user to wear and such systems only allow a single user to see a 3D image at any one time. For reasons of cost effectiveness and user convenience, therefore, display systems that do not require a user to wear glasses have been developed. Such display systems are called autostereoscopic displays.

Autostereoscopic displays typically comprise a conventional display panel, such as an LCD (Liquid Crystal Display) panel, in combination with means for providing the parallax necessary to ensure that the left and right eyes of the user receive the appropriate one of a pair of spectroscopic images. The provision of this parallax results in the user seeing a 3D image.

Some autostereoscopic displays require means for actively determining and tracking the position of a user relative to the display panel in order for a user to continually observe a 3D image. These display systems are, therefore, still only suitable for use by a single viewer. There are, however, known methods for providing an autostereoscopic display which permits multiple viewers to observe 3D images at the same time. The simplest method of achieving a multi-view 3D display is by means of a barrier structure.

A conventional barrier-type autostereoscopic display comprises a backlight, a barrier and a display panel. Typically, the barrier is disposed between the backlight and the display panel. However, the barrier could be positioned in front of the display panel.

The barrier is an opaque screen having a plurality of parallel slits spaced at regular intervals. When the backlight is energised, light emitted therefrom is transmitted through the slits of the barrier forming a plurality of narrow elongate light sources (or line sources), which illuminate the display panel.

In a simple barrier-type display capable of displaying one pair of stereoscopic images (or two views) to a user, alternate columns of sub-pixels of the display panel are driven to display a left-eye image and a right-eye image respectively. The sub-pixels have a periodicity $p_d$ and the display panel is positioned a distance c from the barrier, such that each line source illuminates one pair of columns of sub-pixels. When the barrier-type autostereoscopic display is viewed by a user at a distance d from the display panel, the user's left eye perceives the left-eye image and the user's right eye perceives the right-eye image.

In the case of the autostereoscopic display having two views, the 3D image displayed can only be viewed from one perspective. In order to view a 3D image from multiple perspectives, more views are required. The relationship between the period of the line sources $p_l$ and the number of views m that are required is given by equation (1);

$$p_l = \frac{ap_d}{a - p_d} m \approx p_d m \qquad (1)$$

where, $p_d$ is the period of the sub-pixels and a is the required parallax between each view at the position of the user. The relationship between the viewing distance d, the parallax a and the barrier-to-panel distance c is given by equation (2);

$$a \approx \frac{d}{c} p_d \qquad (2)$$

A second method of producing an autostereoscopic display is to use a sheet of cylindrical lenses positioned in front of a display panel. These lenses focus the light from different columns of sub-pixels to different regions of space so that a user positioned the correct distance from the display panel will see a 3D image.

The principle drawback of the barrier-type display is that only a limited amount of the light generated by the light source passes through the barrier and is transmitted to the display panel. In the case of a simple stereoscopic view, roughly half of the light from the light source is lost. Barrier structures are, therefore, very light inefficient. In the case of a multi-view display having m views, the barrier typically transmits only 100/m % of the light from the light source.

The main disadvantage of the lenticular display is that it is difficult to combine the display with a diffuser for the purpose of making a switchable 2D/3D display. In the case where the diffuser is positioned between the display panel and the sheet of lenses, patterns of light and dark are visible. In the case where the diffuser is positioned in front of the sheet of lenses, the perceived screen resolution is reduced.

According to the present invention there is provided a backlight for a 3D display device, the backlight comprising a planar light guide through which light is guided transversely by internal reflection, wherein regions of the light guide are configured to direct light propagating within the light guide, out of a face of the light guide so as to form a plurality of line light sources.

Preferably, said regions comprise grooves. More preferably, the grooves are filled with a material having a higher refractive index than the light guide.

Preferably, the backlight comprises cylindrical lenses disposed in the mouths of each groove. More preferably, the cylindrical lenses are formed integrally with the material which fills the grooves.

Preferably, the material is Poly(naphthyl methacrylate).

Preferably, the material is a composite material.

Preferably, the material is birefringent. More preferably, the material has a refractive index substantially equal to that of the light guide in a polarisation direction perpendicular to the grooves and a refractive index greater than that of the light guide in a polarisation direction parallel to the grooves. Even more preferably, the material is a stretched polymeric film. Still more preferably, the material is Poly-Ethylene-Terephtalate (PET) or Poly-Ethylene-Naphtalate (PEN).

Preferably, the material which fills the grooves is formed as a layer extending across the upper surface of the light guide, the thickness of the layer being small with respect to the period of the grooves.

Preferably, the grooves have a V-shaped cross-section.

Preferably, the light guide is made from Poly(methyl methacrylate).

Preferably, the backlight comprises a light source disposed adjacent to at least one side face of the light guide. More preferably, the light source is an LED or a CCFL.

Preferably, the light guide comprises a non-pattered substrate and a micro-structured foil.

Preferably, a 3D display device comprising a backlight according to the present invention and a display panel, is provided. More preferably, the grooves of the light guide are skewed by an angle relative to the columns of the-sub-pixels of the display panel. Still more preferably, the 3D display device comprises light diffusing means disposed between the backlight and the display panel, wherein the light diffusing means is switchable between a high scattering mode and a low scattering mode.

Embodiments of the present invention will now be described, by way of example, with reference to the accompanying drawings, in which.

Figure 1:
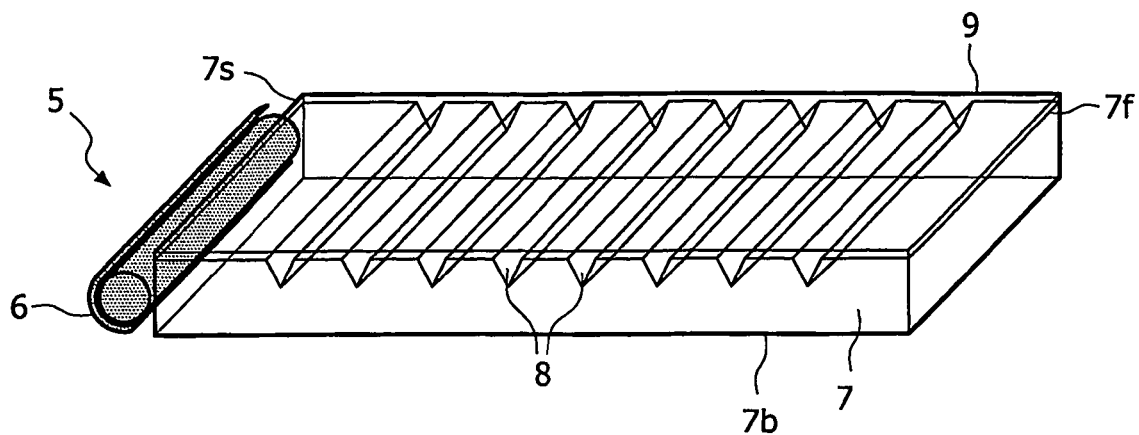
FIG. 1 is a perspective view of an embodiment of a backlight for an autostereoscopic display according to the present invention.
Figure 2:
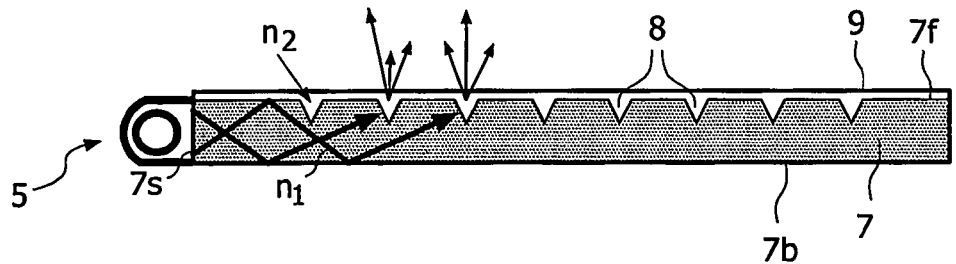
FIG. 2 is a cross-sectional view of the backlight of FIG. 1.

Referring to FIGS. 1 and 2, a backlight 5 for an autostereoscopic display, according to the present invention, comprises a light source 6 and a light guide 7.

The light guide 7 is formed from a sheet of optically transparent material, such as Poly(methyl methacrylate) (PMMA). Preferably, the light guide 7 is plate-like and rectangular, having two major faces, forming the front and back surfaces of the light guide 7f, 7b and four side faces. A plurality of parallel V-section grooves 8, spaced at regular intervals, are provided the front surface of the light guide 7f. The light source 6 is disposed adjacent to a side face of the light guide 7s. The light source 6 could be an LED (Light Emitting Diode) or a CCFL (Cold Cathode Fluorescent Lamp).

Material 9 having a higher refractive index than the light guide 7, such as Poly(naphthyl methacrylate), is disposed on the front surface of the light guide 7f and fills the grooves 8. In one embodiment, the material 9 is in the form of a layer which is coextensive with the light guide 7 and is arranged so that the back of the layer fills the grooves 8 on the front surface of the light guide 7f, and the front surface of the layer is plane parallel with the front surface of the light guide 7f. In this case, the thickness of the layer above the front surface of the light guide 7f is substantially smaller than the period $p_l$ of the grooves 8. This is to ensure that light reflected at the upper surface of the layer, due to total internal reflection, passes directly back into the light guide 7 without being incident on one of the grooves 8.

When the light source 6 is energised, light enters the light guide 7 through one of its side faces 7s. The light entering the light guide 7 is generally constrained, by means of total internal reflection, between the back surface of the light guide 7b and the upper surface of the layer of material 9. However, where the light is incident on a groove 8, it is reflected such that it is incident on the upper surface of the layer of material 9 at an angle which exceeds the critical angle for total internal reflection such that the light is refracted and passes out of the backlight 5. Thus, the light from the light source 6 exits the light guide 7 at positions coinciding with the grooves 8, resulting in a plurality of line light sources.

Figure 3:
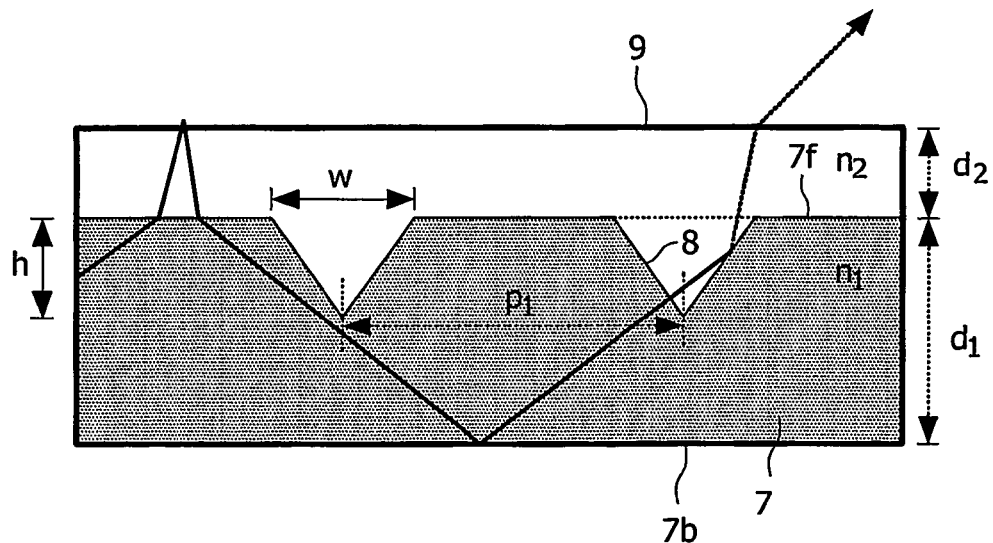
FIG. 3 is a partial cross-sectional view of the backlight of FIG. 1 showing the dimensions of the grooves in the light guide and the typical path of a light ray propagating through the light guide.

Referring to FIG. 3, the thickness of the light guide 7 is $d_1$, the thickness of the layer of material 9 above the front surface of the light guide 7f is $d_2$, the grooves 8 have a total depth of h from the front surface of the light guide 7f, and the periodicity of the grooves 8 is $p_l$. The refractive index of the light guide 7 is $n_1$ and the refractive index of the material 9 is $n_2$. In the case where the light guide 7 is made from PMMA and the material 9 is Poly(naphthyl methacrylate), $n_1$=1.49 and $n_2$=1.63-1.64 respectively.

In another embodiment $d_2$ is equal to zero. In this case the material 9 is solely disposed in the grooves 8 and total internal reflection occurs between the front and back surfaces of the light guide 7f, 7b.

The greater the difference between $n_1$ and $n_2$, the greater the intensity of the line sources becomes and the narrower their angular distributions become. Since these are both advantageous characteristics, it is desirable for the material 9 to have as large a refractive index as is practicably possible. In one embodiment of the present invention, the material 9 is a composite material. The composite material comprises nano-particles of a high refractive index material, such as $TiO_2$ or diamond, composited into a polymeric binder. In this case, the refractive index of the non-scattering composite is an average of that of the nano-particles and the binder.

The brightness of the line sources can be increased by means of a second light source disposed along the opposite side face of the light guide 7 to that of the first light source 6. With this arrangement, the line sources in the middle of the light guide 7 output as much light as the line sources at the edges of the light guide 7.

The distribution of light from the line sources can be homogenised by grading the width w and/or the depth d of the grooves 8 as a function of position along the light guide 7, in order to vary the amount of light that is emitted from each groove 8. Alternatively, it is possible to grade the thickness of the light guide 7 in order to even the distribution of the emitted light by, for example, making the light guide 7 thinner in the middle than at the edges.

Figure 4:
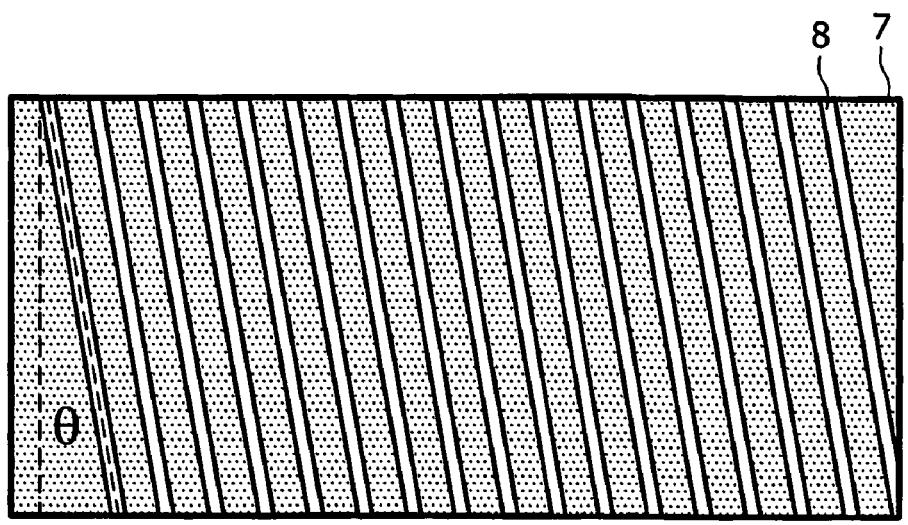
FIG. 4 shows an embodiment of a backlight according to the present invention in which the grooves on the light guide are skewed.

Referring to FIG. 4, in another embodiment of the present invention, the grooves 8 on the light guide 7 are skewed by an angle θ from being parallel to the sides of the light guide 7. In this case, the effective horizontal period of the line sources becomes;

$$p_l \rightarrow p_l \cos \theta \qquad (3)$$

where $p_l$ is the period measured perpendicular to the grooves 8. With this arrangement, a plurality of line sources skewed by an angle θ are produced. A backlight having such skewed line sources can be combined with a display panel to produce an autostereoscopic display in which unwanted visual artefacts associated with multi-view displays, such as vertical banding, can be reduced.

In the case of a multi-view display with non-skewed line sources, the number of pixels in the horizontal direction has to be divided among the different views. This implies that the image resolution of each view will deteriorate in the horizontal direction but not in the vertical direction. For example, in the case of a display having 800×600 pixels and 9 views, the resolution of each view will be 89×600 pixels, which is a very poor horizontal resolution. However, by means of skewing the line sources and driving the display panel accordingly, it is possible to achieve a horizontal and vertical resolution of, for example, 267×200 pixels for each of the 9 views.

Figure 5:
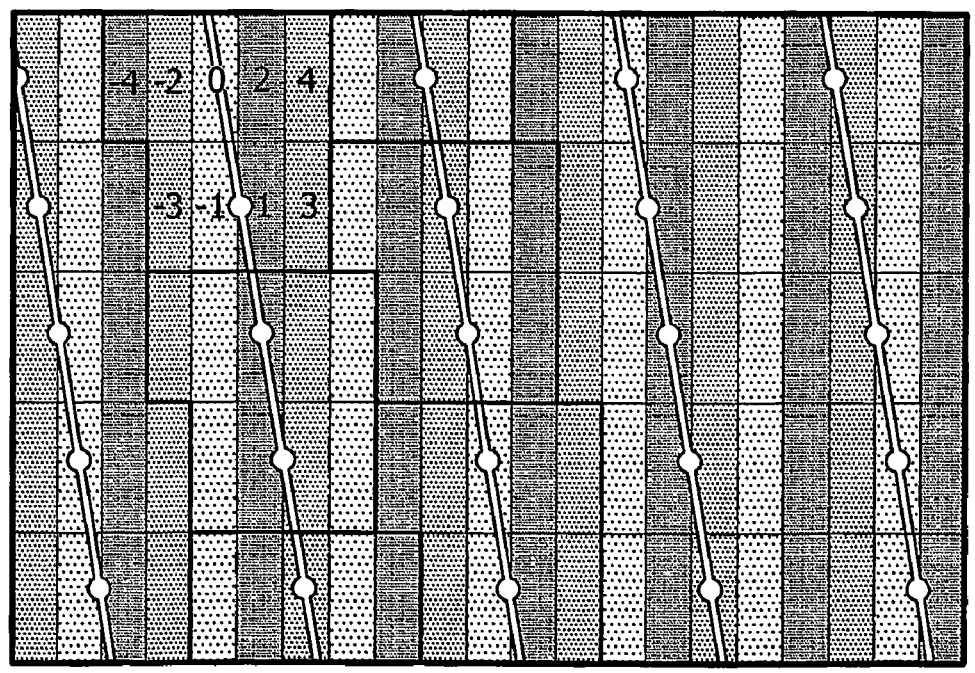
FIG. 5 illustrates how the backlight of FIG. 4 is combined with a display panel.

Referring to FIG. 5, a colour display has 9 views (i.e. m=9) and square pixels. Each pixel has three sub-pixels (R, G and B) and the line sources are skewed from the sub-pixel columns by an angle θ=arc tan (1/6)=9.5°. The corresponding line source period is given by equation (4);

$$p_l = \frac{m}{2} p_d \cos\theta \quad (4)$$

where $p_d$ is the width of the sub-pixels ($p_d$=0.297/3 mm for a 15" XGA display in which case $p_l$=0.440 mm).

Figure 6:
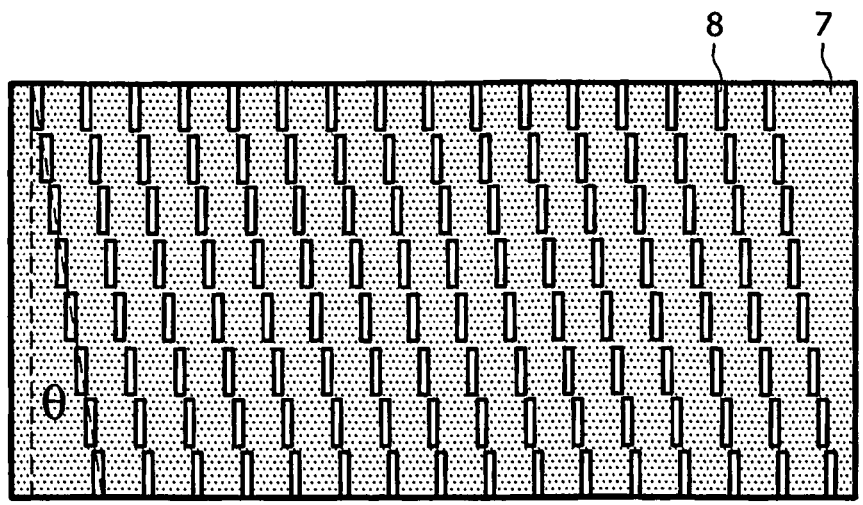
FIG. 6 shows an embodiment of a backlight according to the present invention in which the grooves are segmented and staggered.

Referring to FIG. 6, in another embodiment, the grooves 8 are divided into segments, rather than being continuous, each segment being equal in length to a sub-pixel on a display panel. The segmented grooves are aligned such that they are parallel to the columns of sub-pixels, but are staggered in the direction perpendicular to the sub-pixel columns.

Figure 7:
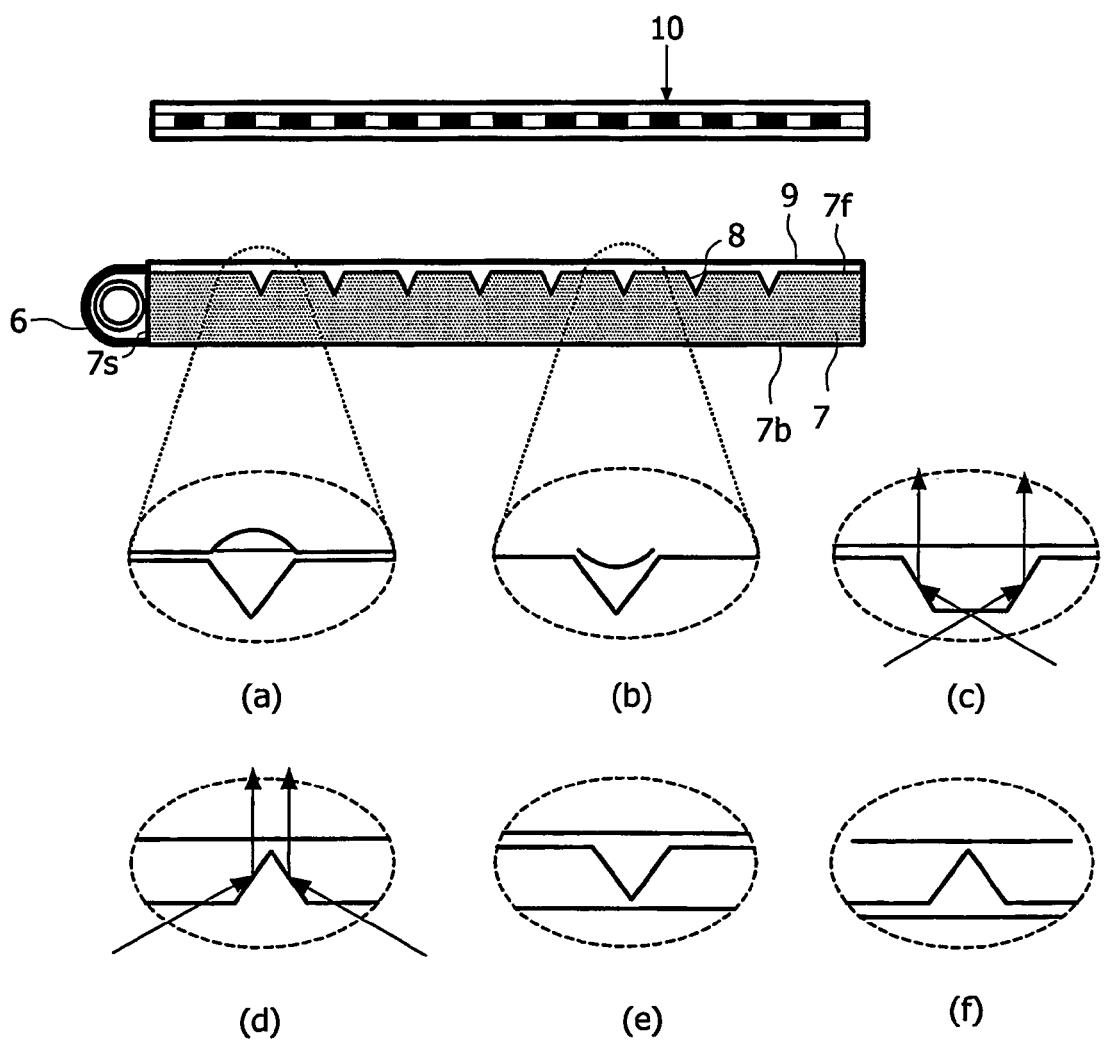
FIG. 7 illustrates further embodiments of a backlight according to the present invention having different groove geometries, additional optical members and additional layers on the light guide.

Referring to FIG. 7, there are many other groove geometries and material parameters which could be used instead of the simple triangular grooves described above. The microgroove structure of the light guide 7 may be augmented with additional structures such as positive (a) or negative (b) lenses, having refractive indices that may differ from that of the light guide 7 or the material 9 used to fill the grooves 8. Different shapes of grooves 8 are also possible (c), (d) as well as additional layers (e), (f).

Figure 8:
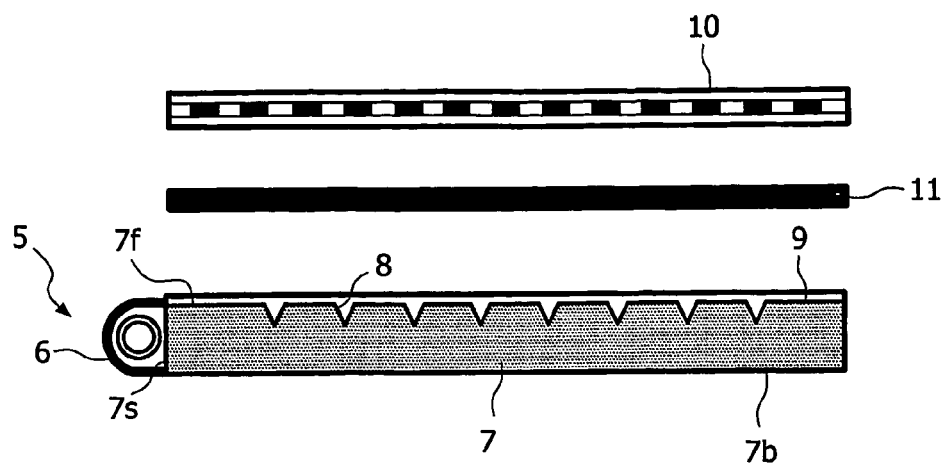
FIG. 8 illustrates an embodiment of the present invention including a switchable diffuser for switching between a 2D mode and a 3D mode.

Referring to FIG. 8, in further embodiment of the present invention a switchable diffuser 11 is disposed between the backlight 5 and the display panel 10. The diffuser 11 is switchable between a low-scattering state in which the light from the backlight 5 passes through it unaffected and a high-scattering state in which the light is diffused across the whole area of the display panel 10 so that it can function as a conventional 2D display. The diffuser 11 may be segmented and controlled such that a window displaying a 3D image can be displayed within a 2D image, or vice versa.

In the case that the light guide 7 and the material 9 filling the grooves 8 are isotropic materials, the light leaving the backlight 5 will be unpolarised. Since LCDs require polarised light, half of the light from the backlight 5 will be wasted. In another embodiment of the present invention the grooves 8 are filled with a birefringent material, the refractive index of which depends on the polarisation direction of the light passing through it. In this embodiment, a uniaxial material that has a refractive index equal to that of the light guide 7 in a direction perpendicular to the grooves 8, and a refractive index higher than that of the light guide 7 in a direction parallel to the grooves 8 is used. With this arrangement, the polarisation component of light propagating in the light guide 7 that is perpendicular to the grooves 8 will not 'see' the grooves 8 and will be reflected back into the light guide 7. Conversely, the polarisation component parallel to the grooves 8 will see the difference in the refractive indices between the light guide 7 and the material 9, causing it to leave the backlight 5. Thus, light with the wrong polarisation cannot leave the backlight 5. Since, in practice, the light guide 5 will have imperfections, the component of the light that initially has the wrong polarisation direction will gradually be rotated until it has the correct polarisation direction required to leave the backlight 5. Also, the many internal reflections that the light propagating in the light guide 7 undergoes rotate the polarisation direction. In a variation of this embodiment, the process of gradually rotating the polarisation direction is increased by means of an additional birefringent layer.

The material 9 filling the grooves 8 is made birefringent by stretching a film of this material 9 and hot-pressing it into the grooves 8. For example, stretched polymeric films made from Poly-Ethylene-Terephtalate (PET) or Poly-Ethylene-Naphtalate (PEN) have values of $n_2$ as high as 1.71 and 1.85, respectively.

Figure 9:
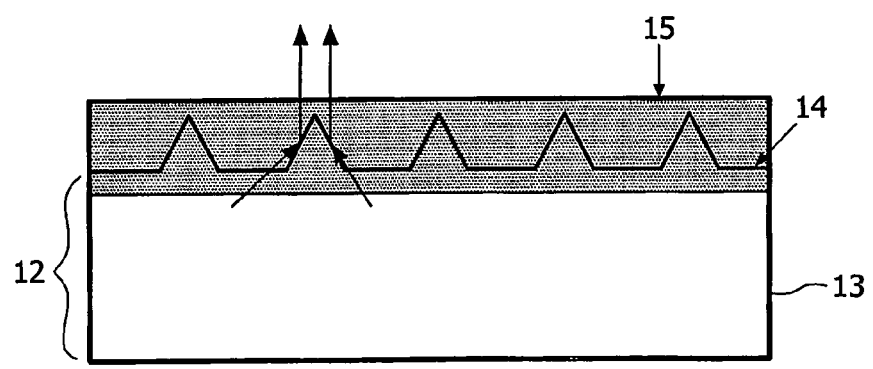
FIG. 9 illustrates an embodiment of a backlight according to the present invention comprising a micro-structured foil laminated onto a non-patterned substrate.

Referring to FIG. 9, in a further embodiment of the present invention, a light guide 12 comprises a non-patterned substrate 13 and a micro-structured foil 14 laminated onto a major face of the substrate 13. The foil 14 is coextensive and plane parallel with the substrate 13. A material 15 with a refractive index higher than that of the light guide 12 is disposed on top of the foil 15. The total internal reflection of the light propagating within the light guide 12 is frustrated at the microstructures on the foil 14 and the microstructures are arranged so as to produce line light sources.

From reading the present disclosure, other variations and modifications will be apparent to persons skilled in the art. Such variations and modifications may involve equivalent and other features which are already known in the design, manufacture and use of autosteroscopic displays and component parts thereof and which may be used instead of or in addition to features already described herein.

The invention claimed is:

1. A three-dimensional (3D) display device comprising a backlight, the backlight comprising a planar light guide through which light is guided transversely by internal reflection, wherein regions of the light guide are configured to direct light propagating within the light guide by internal reflection, out of a face of the light guide without passing through the light guide after being directed by the regions so as to form a plurality of line light sources, the regions comprising grooves filled with a material having a higher refractive index than the light guide, wherein the material which fills the grooves is formed as a layer extending across an upper surface of the light guide, the thickness of the layer being less than a period of the grooves.

2. The 3D display device according to claim 1, wherein said grooves are positioned on the face of the light guide through which light propagates out of the light guide.

3. The 3D display device according to claim 2, comprising cylindrical lenses disposed within the mouths of each groove.

4. The 3D display device according to claim 3, wherein the cylindrical lenses are formed integrally with the material which fills the grooves.

5. The 3D display device according to claim 1, wherein the material is Poly(naphthyl methacrylate).

6. The 3D display device according to claim 1, wherein the material is a composite material.

7. The 3D display device according to claim 1, wherein the material is birefringent.

8. The 3D display device according to claim 7, wherein the material has a refractive index substantially equal to that of the light guide in a polarization direction perpendicular to the grooves and a refractive index greater that that of the light guide in a polarization direction parallel to the grooves.

9. The 3D display device according to claim 7, wherein the material is a stretched polymeric film.

10. The 3D display device according to claim 9, wherein the material is one of Poly-Ethylene-Terephtalate (PET) and Poly-Ethylene-Naphtalate (PEN).

11. The 3D display device according to claim 2, wherein the grooves have a V-shaped cross-section.

12. The 3D display device according to claim 1, wherein the light guide is made from Poly(methyl methacrylate).

13. The 3D display device according to claim 1, comprising a light source disposed adjacent to at least one side face of the light guide.

14. The 31D display device according to claim 13, wherein the light source is one of an LED and a CCFL.

15. The 3D display device according to claim 2, comprising a backlight and a display panel.

16. The 3D display device according to claim 15, wherein the grooves of the light guide are skewed by an angle relative to columns of sub-pixels of the display panel.

17. The 3D display device according to claim 15, comprising a light diffuser disposed between the backlight and the display panel, wherein the light diffuser is switchable between a high scattering mode and a low scattering mode.

18. The 3D backlight according to claim 1, wherein the light guide comprises a non-pattered substrate and a microstructured foil.

19. The 3D display device according to claim 1, wherein the material is not birefringent.

20. The 3D display device according to claim 1, wherein the regions further comprise microstructures positioned on the face of the light guide through which light propagates out of the light guide.

21. The 3D display device according to claim 1, wherein the regions are arranged such that light exits the light guide at positions coinciding with the regions.

* * * * *